United States Patent [19]

Levallois

[11] Patent Number: 4,789,970
[45] Date of Patent: Dec. 6, 1988

[54] METHOD AND DEVICE FOR POSITIONING AN ELEMENT USING ULTRASONIC SENSORS

[75] Inventor: Emile Levallois, Courbevoie, France

[73] Assignee: Institut Francais du Petrole, Malmaison, France

[21] Appl. No.: 947,753

[22] Filed: Dec. 30, 1986

[30] Foreign Application Priority Data

Dec. 30, 1985 [FR] France ................................ 85 19462

[51] Int. Cl.⁴ .............................................. G01S 9/68
[52] U.S. Cl. ...................................... 367/104; 367/99
[58] Field of Search .................. 367/104, 99, 103, 124

[56] References Cited

U.S. PATENT DOCUMENTS

| 4,292,678 | 9/1981 | Kay | 367/99 |
| 4,460,987 | 7/1984 | Stokes et al. | 367/103 |
| 4,635,241 | 1/1987 | Saglio | 367/99 |
| 4,653,033 | 3/1987 | Posseme | 367/124 |

Primary Examiner—Thomas H. Tarcza
Assistant Examiner—Daniel T. Pihulic
Attorney, Agent, or Firm—Antonelli, Terry & Wands

[57] ABSTRACT

The present invention provides a method and device for determining the positioning of an element or target using at least one acoustic emitting-receiving sensor. In this method only the signal received by said sensor and due to the diffraction of the signal emitted by said sensor is taken into account.

7 Claims, 3 Drawing Sheets

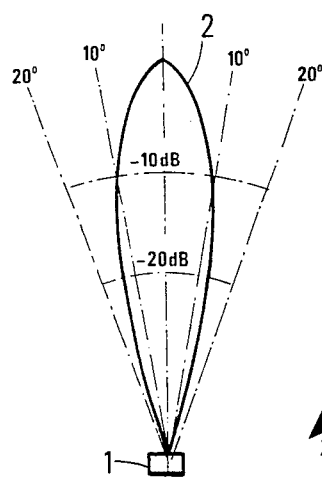
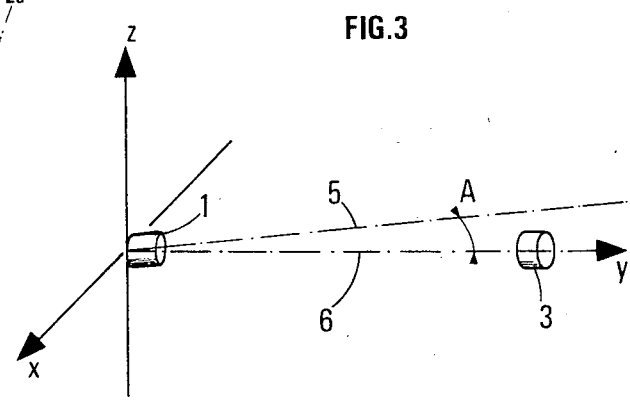
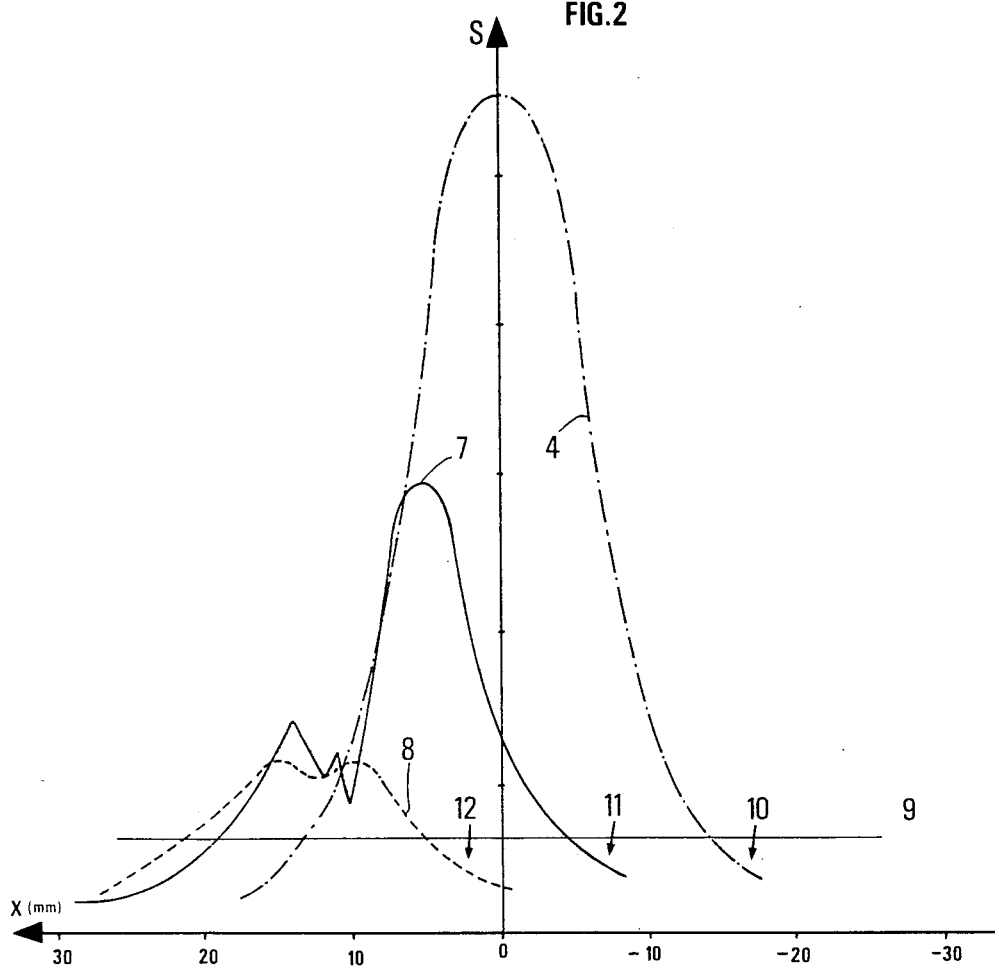

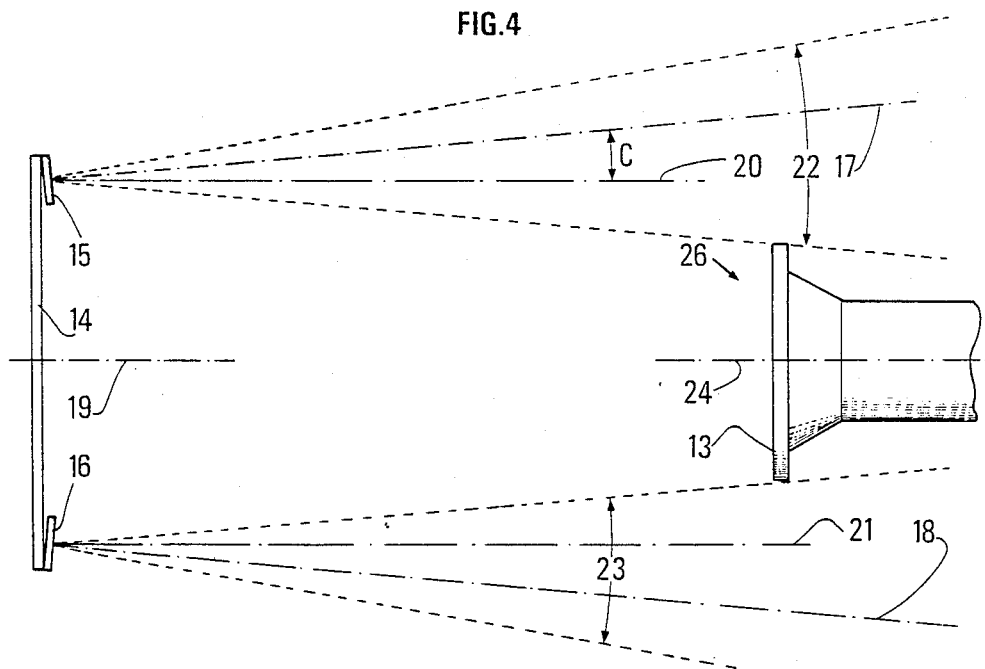
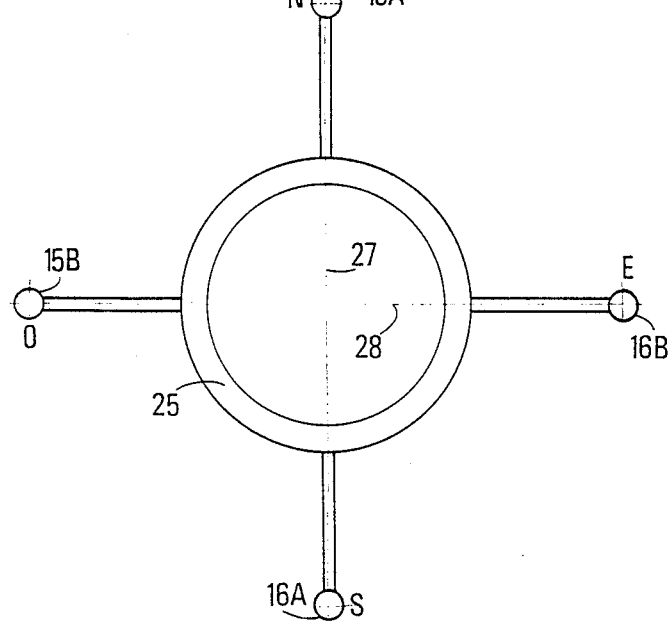

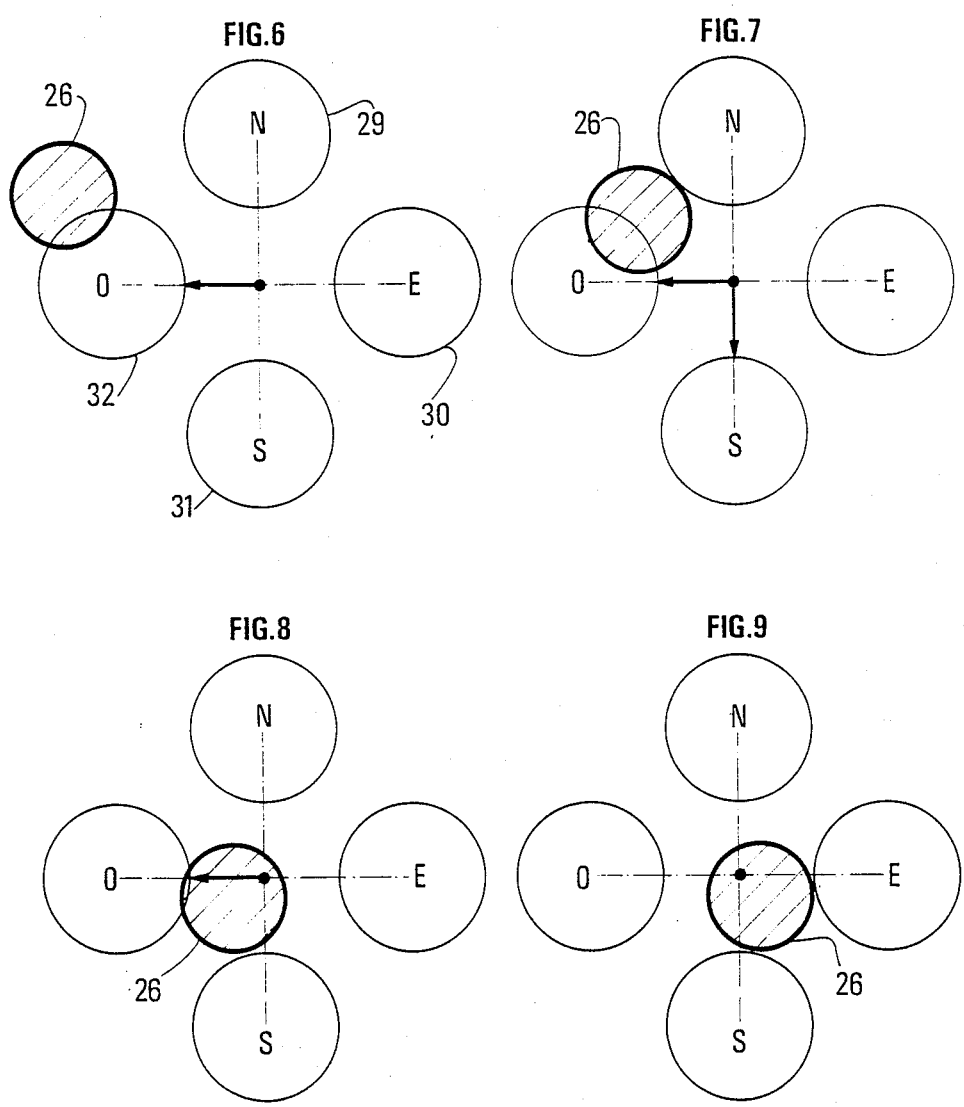

ns of sensors

METHOD AND DEVICE FOR POSITIONING AN ELEMENT USING ULTRASONIC SENSORS

BACKGROUND OF THE INVENTION

1. Field of the Invention

The present invention relates to a method and device for determining the position of an element possibly immersed in a liquid medium.

With the present invention two elements possibly immersed in a liquid medium can be placed in a given relative position.

For example, work carried out at the bottom of the sea, it may be necessary to place two separate elements at a given relative position, more particularly for connecting them together (see French Pat. No. 2 136 291). These elements may be two pipes which are to be connected end to end, or else a pipe and an immersed structure, such as a well or an immersed manifold of the oil manifold type, etc . . . .

2. Description of the Prior Art

These operations, already difficult to carry out when they are effected under the direct control of divers, raise problems when "robots" are used which are equipped with at least one television camera and lighting equipment. In this case, the operator who is at the surface visually controls the assembly operations and accordingly controls the manipulating arms of the robot.

This solution, besides its high cost, has drawbacks which result from the fact that the space controlled visually by the operator is of relatively small dimensions. In fact, the lighting at most only provides vision in a space of a few meters in diameter, often not exceeding two meters. This optical field is often obscured by loose sediments at the bottom of the sea which are stirred up by movement of the water following movement of the parts to be assembled. In some cases, the optical field is is completely obscured. Finally, the accuracy of assembly is limited by the fact that very often the operator only has a two dimensional image for visual control.

SUMMARY OF THE INVENTION

With the present invention, the accurate relative positioning of two geometrical axes belonging respectively to two elements can be achieved using a method and apparatus of simple design, of a relatively low cost and not having the drawbacks of the prior devices. The use of the present invention requires a number of sensors less than that required in the patent FR—No. 2.517.068, and in addition the present invention may be implemented in a medium which is not electrically conducting.

The present invention provides a method for determining the position of an element or target, using at least one acoustic emitting-receiving sensor. This method is characterized more particularly in that only the signal received by said sensor due to the diffraction of the signal emitted by this sensor is taken into account.

More particularly, the signal received is only taken into account if the angle which the emission access of the sensor forms with a plane of the target is less than 90° at the time that the signal is received during a relative movement of the target and the sensor.

According to the present invention, at least are pair of two sensors are provided having emission axes belonging to the same plane and whose emission axes form therebetween a non zero angle, the meeting point of the axes being situated upstream of the sensors, relative to their emission direction.

The present invention also relates to a device for positioning an element or target, using acoustic emitting-receiving sensors.

This device is characterized more particularly in that it includes at least three sensors having divergent emission directions.

The device of the invention may include four sensors having divergent emission directions.

The sensors may be spaced apart over a circle and the emission axis of each sensor may form an angle equal to or greater than 5° with a central axis perpendicular to the plane containing the circle and passing through the center of the circle. Each meeting point of the emission axes with the central axis is situated in front of the circle relative to the emission direction of the sensors.

BRIEF DESCRIPTION OF THE DRAWINGS

The present invention will be more particularly defined and its advantages will appear more clearly from the following description of particular embodiments which are in no way limitative of the present invention as illustrated by the accompanying Figures in which:

FIG. 1 shows an acoustic sensor and its emission lobe,

FIG. 2 shows signals obtained by sweeping a target by means of an acoustic emitting-receiving sensor at different emission angles, FIG. 3 illustrates schematically the manner in which the preceding sweeping is carried out, FIGS. 4 and 5 illustrate one embodiment of the invention for positioning an element and, FIGS. 6 to 9 illustrate one procedure for positioning an element.

DESCRIPTION OF THE PREFERRED EMBODIMENTS

In order to facilitate understanding of the present invention, it is necessary to make the following remarks:

each sensor operates both a receiver and an emitter, it receives an echo of its own emission formed by a pulse of very short duration, the ultrasonic sensors 1, FIG. 1, used in the examples given hereafter have an emission/reception diagram substantially identical to that shown in FIG. 1. The angle formed by the two tangents with infinite attenuation is called opening of lobe 2, there exist three zones for a sensor in the case where this sensor is aimed perpendicularly at a target having, for example, a diameter of 11 mm and placed at a distance of 20 cm from the plane containing the sensor.

The first zone is that in which the target is situated outside the zone of action of the sensor, namely 20 mm to 20 cm. In this zone no echo can be received, since any ray coming from a point in this zone passes through the sensor with an angle greater than the infinite attenuation angle. The curve 4 of FIG. 2 confirms substantially this fact. The graph of FIG. 2 shows the amplitudes of the echo as a function of the position of the sensor.

The second zone is the one in which the target 3 is situated in the zone of action of the sensor, but where the rays reflected by the target do not intercept the sensor 1. In this zone which goes from 20 mm to 10 mm for the above given numerical example (target of 11 mm in diameter), the presence of an echo is due to the diffraction of the beam on the irregularities of the target, in particular on the edges. Curve 4 of FIG. 2 shows that towards + or −10 mm a change of curvature can be observed.

The third zone is the one in which the sensor receives the beam reflected by the target. A maximum exists since the system is symmetrical.

In the case where the axis 5 of the sensor 1 (see FIG. 3) forms an angle A with the axis 6 of the target 3, the separation into three zones remains valid but several phenomena are to be noted:

the echo corresponding to the curve 7 (FIG. 2), for an angle A of 2.5°, and to the curve 8 (FIG. 2), of one angle A of 5°, becomes totally asymmetrical because of an interference phenomenon appearing after the first maximum in the increasing x axis direction.

the first maximum does not correspond with the axis of the passing through the sensor center of the target, but is a little in front in the increasing x axis direction.

If we place ourselves in the second zone a phenomenon can be observed which is quite interesting for the implementation of the present invention.

In FIG. 2, a horizontal straight line 9 is drawn (constant amplitude passing through zone 2). It can be seen that on the right hand side of the curves, this horizontal straight line intercepts the three cuurves 4, 7 and 8 with intervals corresponding similarly to the original shift created by rotation of the sensor. On the left hand side, the gap is because of the deformation of the curves due to the interferences.

This phenomenon can be explained in the following way: in zone 2 the echos were due essentially to the phenomena of diffraction on the edges of the target. It is therefore normal that a slant of the target (or of the sensor, which is tantamount to the same thing) has no influence on the amplitude of the echos, since by definition diffraction does not create privileged directions.

The three curve portions 10, 11 and 12 situated respectively on the right hand part of curves 4, 7 and 8 in FIG. 2 corresponding to zone 2, namely over about 10 mm, are superimposed almost perfectly.

It may be remarked that if a detection threshold is created situated in zone 2 and valid up to a maximum predefined angulation the position of the target may be defined with precision, providing it is situated geometrically on the side where the aiming axis of the sensor forms an angle <90° with the plane of the target at the moment when this axis touches the target.

The present invention may be used for determining the positioning of an immersed flange and if required for making the connection of an element (or connector) with this flange.

Reference 13 in FIG. 4 designates the plane of the flange whose position is to be determined.

The reference 14 designates a frame supporting at least two sensors 15 and 16. The emission half axes of these sensors form therebetween a given non zero angle B but do not intersect in the emission direction. In fact, the point of intersection is situated behind the sensors considering the emission direction thereof. The emission half axis of a sensor having a cylindrical and flat emission insert refers to the half axis from the center of this insert, perpendicular to this insert and which is oriented in the emission direction of the insert.

The reference 19 in FIG. 4 designates the main axis of the pair of sensors 15 and 16 which is defined as being the bissectrix of the angle B formed by the axes supporting the emission half axes of the two sensors 15 and 16.

The references 20 and 21 designate respectively the half axes parallel to the main axis 19, coming respectively from the center of sensors 15 and 16 and which are oriented in the emission direction of these sensors.

The emission half axes 17 and 18 form an angle $C=B/2$ with the main axis. It is the divergence of the two emission half axes which allows the positioning of the flange to be defined using the diffraction phenomenon. Conclusive tests have been carried out with an angle C substantially equal to 5°.

References 22 and 23 designate respectively the emission cones of the sensors 15 and 16. These cones are shown in broken lines.

Two centering procedures are possible from the time of bringing the device of the invention into surface.

The first consists of placing the sensors 15 and 16 so that the edges of the flange (centered flange) always intercept the globes of action of the sensors. This procedure would allow the flange to be centered in the two planes by balancing the amplitude of the two symmetrical sensors with respect to the axis. The drawback are that the edge of the lobes is not parallel to the axis of the connector and that, even in the case where two echos are obtained on the two sensors, there would be no certainty that it would be a diffraction echo.

The second method consists in leaving a space between the edge of the flange and the zone of action of the sensor; this is the case of FIG. 4. The measurement consists in this case in causing the flange to describe small movements along a perpendicular to the axis 24 of the flange until echos of given amplitudes appear. Centering consists in placing the flange in the center of the segment thus described. The manipulating arm supporting the flange participates actively in this measurement.

This method seems more certain than the first one.

The present invention may be used for providing the connection of a connector (25) with a flange (26). In the following example which illustrates such a connection, the connector is fixed to a frame carrying two pairs of sensors (15A, 16A, and 15B, 16B) identical to the one discussed above in the present description whose main axes are superimposed, the two pairs of sensors being offset by 90° (see FIG. 5).

So as to facilitate understanding of the connection procedure, the movements in the directions defined by each pair of sensors are designated by North and South, and East and West.

The sensors 15A, 16A, 15B and 16B are also designed respectively North, South, West and East. Thus a movement along axis 27 joining together the South and North sensors and taking place in the South to North direction is called a North movement, a movement along the same line but in the opposite direction is called a South movement. Similarly, a movement along the axis 28 joining together the West and East sensors and taking place in the West to East direction is called an East movement and a movement in the opposite direction is a West movement. Thus, although the designations North, South, East and West have nothing to do with the four geographical cardinal points, the mechanism for designating the movements is the same. To make this connection, several tasks must be carried out, the first of which is a preparation task which consists in bringing the connector to a distance less than a given distance and into a given end position from which the device of the invention will make the connection. FIG. 6 shows the position of the flange 6 which is crosshatched) at the end of the preparation phase. The circles 29, 30, 31 and 32 represent respectively the plots of the periphery of the lobes of the respective North, East, South and West sensors in a plane containing the flange. The plot of the lobes has been shown in an approximate manner by circles. In the center of each plot is designated the sensor which is the cause of it.

From the situation shown in FIG. 6, the connection procedure, possibly automatic, may be carried out by the device of the invention. This procedure comprises several tasks among which some will be described hereinafter.

The presentation task consists in taking into account the geographical data of the flange (heading, elevation, and the height of the flange with respect to the ground) so as to align the axis of the connector having the measurement ring or frame (reference RA) with the axis of the flange (reference RB). After carrying out the task, the coordinates of the reference RB within the reference RA are within given predetermined intervals.

The search task consists in moving the connector in the plane of the sensors which is almost orthogonal to the axis of the flange, searching for the first significant echo of a connector/flange distance measurement. This movement may be made in uniformly distributed steps following a path defined beforehand, crenellated or spiral pattern etc . . . (or random).

As soon as the measuring ring detects a significant echo at a real connector/flange distance, the "search" task gives place to the "localization" task.

When an echo has been found, it is necessary to center the connector to better than a predetermined tolerance value, for example 40 mm, that is to say to cause the flange to enter the space defined by the lobes of the different sensors.

For this, the following procedure may be used:

The sensor M initiates a movement towards the North, or stops a movement towards the South.

The sensor E initiates a movement towards the East, or stops a movement towards the West.

The sensor S initiates a movement towards the South, or stops a movement towards the North.

The sensor O initiates a movement towards the West, or stops a movement towards the East.

By movement in a given direction (for example North) is meant the direction determined by the straight line passing through the sensor having as reference the initial letter of the given direction (North) except for West for which the reference is O and the center of the connector. It is not a question of geographical loci.

FIGS. 6 to 9 show the path which the network of sensors will follow by application of the above method for the starting configuration shown in the first FIG. 6.

The arrows at the center of FIGS. 6 to 9 designate the directions of the different movements.

It can be seen that whatever the initial position the procedure will always be convergent.

In FIG. 9 the flange is localized.

The approach and penetration procedure may then be carried out. This procedure includes two tasks which are reiterated until the final connection is obtained. The centering task will be made by following closely the action lobes of the sensors. Once this centering is obtained, the advancement task is initiated which will cause an advance by steps, possibly variable, as a function of the distance which separates the flange and the connector. At the end of each step a centering task is carried out.

These two tasks as well as the localization task may be controlled by a computer controlling a manipulating robot, since it is the same measurement ring which decides the "direction" and the "step" of the movement of the connector.

Two pairs of two North, South and East, West sensors are described, however the principle of this method is also applicable to the case where there are only three sensors spaced over a circle. In the preceding example, each of them may be possibly offset by 120° with respect to the other.

What is claimed is:

1. A method for determining a position of an object using at least one acoustic emitting-receiving sensor comprising the steps of:
    emitting a signal from said at least one acoustic sensor toward said object, said signal comprising an emission cone of waves;
    processing received waves for detecting only the waves at an edge of said emission cone of waves which have been diffracted by an edge of said object; and
    determining the position of said object with respect to said at least one acoustic sensor based on said detected waves of said emission cone of waves.

2. A method for determining a position of an object according to claim 1, wherein said determining step is performed based on detected waves of said emission cone of waves only when an emission axis of said at least one sensor is at an angle which is less than 90° with respect to a plane of said object, and when either said at least one sensor or said object is being moved relative to the other.

3. A method for determining a position of an object according to claim 1, wherein said at least one acoustic emitting-receiving sensor includes a pair of sensors having emission axes in a same plane and forming a non-zero angle with each other, said emission axes intersecting at a point which is upstream of said pair of sensors relative to their emission direction.

4. A method for determining a position of an object according to claim 1, wherein said at least one acoustic emitting-receiving sensor includes at least three acoustic sensors having different divergent emission directions.

5. A method for determining a position of an object according to claim 4, wherein said at least three acoustic sensors comprise four acoustic sensors.

6. A method for determining a position of an object according to claim 4, wherein said at least three sensors are disposed in substantially the same plane and the divergent emission directions thereof are oriented in a same half-space which is limited by said plane.

7. A method for determining a position of an object according to claim 1, wherein said at least three sensors are spaced apart in a circular pattern such that the emission axis of each of said sensors forms an angle greater than or equal to 5° with respect to a central axis which is perpendicular to a plane containing said circular pattern, said central axis passing through the center of said circular pattern, each emission axis of each of said sensors intersecting said central axis at a position in front of said circular pattern, relative to the direction of emission of said sensors.

* * * * *